(12) United States Patent
Chen

(10) Patent No.: US 7,508,183 B2
(45) Date of Patent: Mar. 24, 2009

(54) POWER SUPPLY CONTROLLER AND METHOD THEREFOR

(75) Inventor: Gang Chen, Hong Kong (CN)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 291 days.

(21) Appl. No.: 11/185,400

(22) Filed: Jul. 21, 2005

(65) Prior Publication Data

US 2007/0018627 A1    Jan. 25, 2007

(51) Int. Cl.
    *G05F 1/00* (2006.01)
(52) U.S. Cl. ...................... 323/288; 323/285
(58) Field of Classification Search ................ 323/280, 323/281, 282–285, 288; 363/95, 97, 98; 332/109, 117
    See application file for complete search history.

(56) References Cited

U.S. PATENT DOCUMENTS

| | | | | |
|---|---|---|---|---|
| 5,359,281 A * | 10/1994 | Barrow et al. | | 323/284 |
| 5,831,418 A * | 11/1998 | Kitagawa | | 323/222 |
| 5,905,370 A * | 5/1999 | Bryson | | 323/283 |
| 6,147,477 A * | 11/2000 | Saeki et al. | | 323/273 |
| 6,424,132 B1 * | 7/2002 | Wrathall | | 323/282 |
| 6,519,165 B2 * | 2/2003 | Koike | | 363/21.12 |
| 6,756,771 B1 * | 6/2004 | Ball et al. | | 323/222 |
| 6,882,551 B2 * | 4/2005 | Shimada et al. | | 363/79 |
| 6,894,466 B2 * | 5/2005 | Huang et al. | | 323/272 |
| 7,005,836 B1 * | 2/2006 | Rice | | 323/288 |
| 7,057,381 B2 * | 6/2006 | Harriman et al. | | 323/285 |
| 7,061,218 B2 * | 6/2006 | Ito | | 323/351 |
| 2005/0242798 A1 * | 11/2005 | Umminger | | 323/282 |

OTHER PUBLICATIONS

Data Sheet, Complete DDR and DDR2 Memory Power Solution Synchronous Buck Controller, 3-A LDO, Buffered Reference, TPS5116, SLUS609C—May, 2004—Revised Apr. 2005, Texas Instruments, pp. 1-33.
Data Sheet Ultra-High Efficiency, Dual Step-Down Controller for Notebook Computers, MAX1715, Maxim Integrated products, 19-1541; Rev 1; May 2000, pp. 1-25.
Data Sheet "Dual, High-Efficiency, Step-Down Controller With Accurate Current Limit, MAX1845", Maxim Integrated Products, 19-1955; Rev 2; Jan. 2003, pp. 1-27.

* cited by examiner

*Primary Examiner*—Jessica Han
*Assistant Examiner*—Emily Pham
(74) *Attorney, Agent, or Firm*—Robert F. Hightower

(57) ABSTRACT

In one embodiment, a power supply controller utilizes a plurality of reference signals that operate at different frequencies to form a switching signal that is suitable to control a power device to regulate an output voltage.

17 Claims, 6 Drawing Sheets

POWER SUPPLY CONTROLLER AND METHOD THEREFOR

BACKGROUND OF THE INVENTION

The present invention relates, in general, to electronics, and more particularly, to methods of forming semiconductor devices and structure.

In the past, the semiconductor industry utilized various methods and structures to produce switching power supply controllers such as pulse width modulated (PWM) power supply controllers. The system typically supplied a current and a regulated output voltage to a load. During the operation of these PWM power supply controllers, it was possible for the current requirements of the load to change requiring transitions between supplying increased and decreased amounts of current. Typically, the response time of the power supply controllers was limited which resulted in a poor transient response. The poor transient response resulted in variations in the value of the output voltage supplied to load and also limited the value of the current that could be supplied to load during the transient.

Accordingly, it is desirable to have a power supply controller that has improved response to variations in the current required by the load.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay between the reaction that is initiated by the initial action.

DETAILED DESCRIPTION OF THE DRAWINGS

Figure 1:
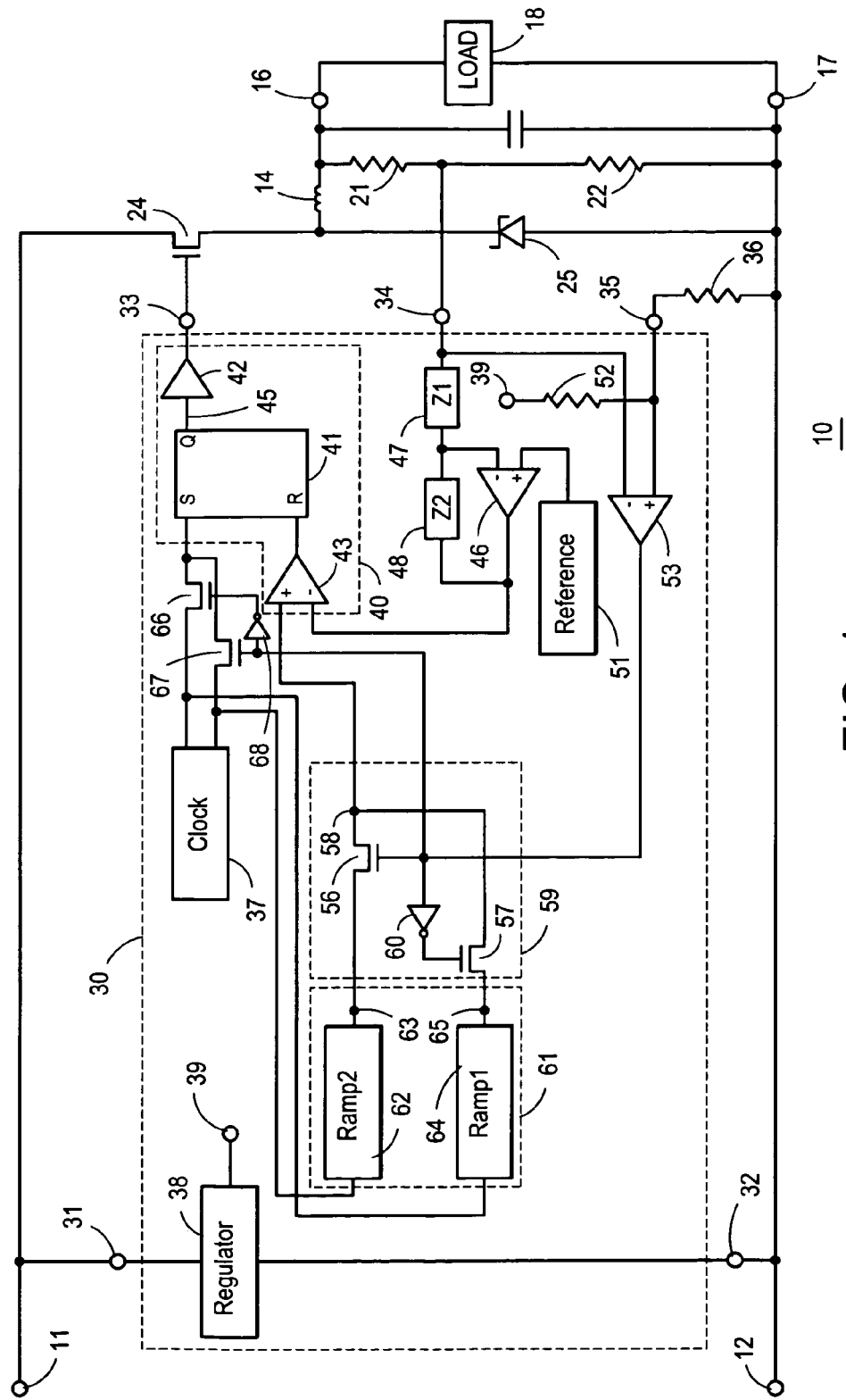
FIG. 1 schematically illustrates an embodiment of a portion of a power supply system having a power supply controller in accordance with the present invention.

FIG. 1 schematically illustrates an embodiment of a portion of a power supply system 10 having an exemplary form of a power supply controller 30 that has improved transient response. Power supply system 10 typically receives power between a power input terminal 11 and a power return terminal 12 and forms an output voltage between an output 16 and an output return 17. Return 17 is generally connected to return 12. A load 18 may be connected to receive the output voltage and a load current from output 16 and return 17. The voltage applied between terminals 11 and 12 may be a dc voltage or a rectified ac voltage such as a half-wave rectified sine-wave. System 10 typically includes an inductor 14 that is controlled by a power switch, such as a power transistor 24, to form the output voltage. A diode 25 functions as a freewheeling rectifier. In some embodiments, diode 25 may be a power transistor that is controlled by controller 30. System 10 also generally includes a feedback network, illustrated by series connected resistors 21 and 22, that is utilized to provide a feedback (FB) signal that is representative of the value of the output voltage between output 16 and return 17. Such feedback (FB) networks and feedback (FB) signals are well known to those skilled in the art. In some embodiments, transistor 24 and diode 25 may be included as a part of controller 30.

Controller 30 is configured to receive the FB signal on an FB input 34 and responsively form a switching signal on an output 33 that is utilized to control transistor 24 and regulate the value of the output voltage between output 16 and return 17. As will be seen further hereinafter, controller 30 also utilizes a first reference signal that has a first frequency to form the switching signal to control the output voltage responsively to a first value of the output voltage and to use a second reference signal that has a second frequency to form the switching signal responsively to a second value of the output voltage.

Controller 30 receives power between a voltage input 31 and a voltage return 32. Input 31 generally is connected to terminal 11 and return 32 typically is connected to terminal 12. Controller 30 generally includes a variable reference generator section 61, a selector 59, a PWM control section 40, a clock generator or clock 37, a fixed reference generator or reference 51, an error amplifier 46, and a select controller implemented as a comparator 53. Impedances 47 and 48 may be connected to amplifier 46 to provide frequency compensation as is well known to those skilled in the art. Controller 30 also typically includes an internal regulator 38 that is utilized to form an internal operating voltage on an output 39 for operating some of the elements of controller 30 such as sections 40 and 61, reference 51, clock 37, and comparator 53. PWM control section 40 generally includes a PWM comparator 43, a PWM latch 41 that forms a PWM control signal 45 on a Q output of latch 41, and a driver 42 has a drive sufficient to control transistor 24.

Reference generator section 61 includes a plurality of reference generators that each generate a reference signal having a variable output value. The operating frequency of each reference signal of the plurality of reference signals generally is different from other reference signals of the plurality of reference signals.

In the preferred embodiment, section 61 includes a first ramp generator or ramp 64 and a second ramp generator or ramp 62. Ramp 64 generates a ramp signal 65 that has an output voltage that varies in value and repeats at a first frequency and ramp 62 generates a second ramp signal 63 that has an output voltage that varies in value and repeats at a second frequency that is different from the first frequency. Selector 59 is configured to select between signals 63 and 65 and couple one of signal 63 or signal 65 to comparator 43 so that controller 30 may use either signal 65 that varies at the first frequency to form signal 45 responsively to a first value of the output voltage or may use signal 63 that varies that the second frequency to form signal 45 responsively to a second value of output voltage. An exemplary embodiment of selector 59 as illustrated in FIG. 1 includes a first transistor 57, a second transistor 56, and an inverter 60. Comparator 53 is configured to form a select signal that controls selector 59 to select either signal 63 or 65. A clock selector circuit is used to synchronize the clock signals used for generating the reference signal and for operating PWM control section 40. The clock selector circuit includes coupler transistors 66 and 67 and an inverter 68.

Figure 2:
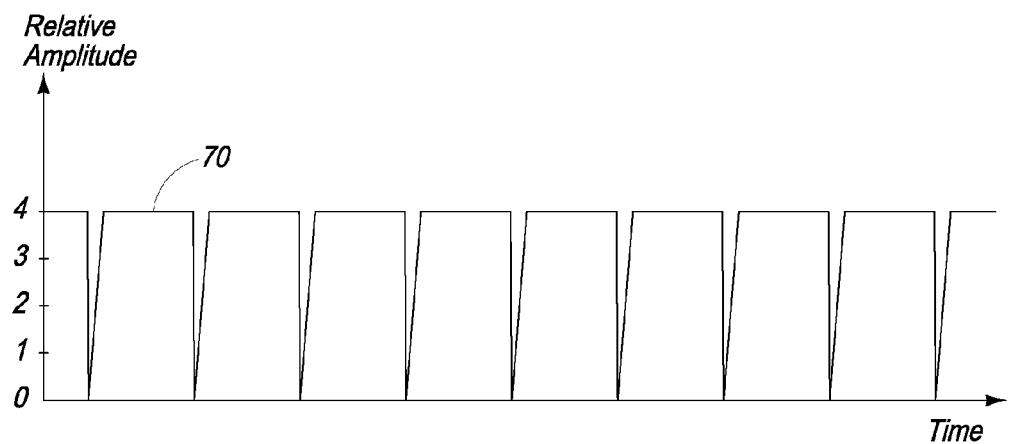
FIG. 2 is a graph having plots of some signals of the power supply controller of FIG. 1 in accordance with the present invention.
Figure 2:
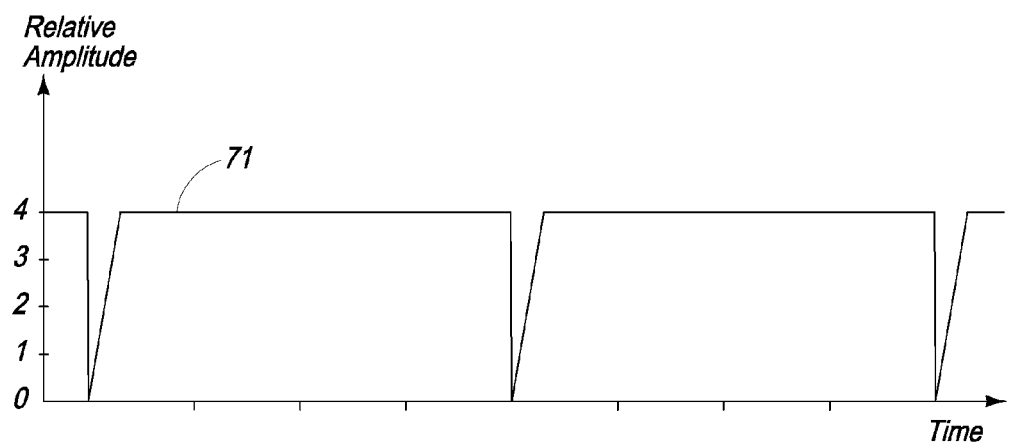

FIG. 2 is a graph having plots that illustrate the amplitude and frequency of signals 63 and 65. The abscissa indicates time and the ordinate illustrates relative amplitude of the signals. A plot 70 illustrates the amplitude and frequency of signal 63 and a plot 71 illustrates the frequency and amplitude of signal 65. This description has references to both FIG. 1 and FIG. 2.

As illustrated by plots 70 and 71, ramp 62 forms signal 63 to have a frequency that is greater than the frequency of signal 65. Comparator 53 receives the FB signal and a select reference signal from a select input 35 of controller 30, and forms the select signal on an output of comparator 53 responsively to the value of the output voltage as represented by the FB signal. The select reference signal is formed by a resistor 52 of controller 30 and an external resistor 36. Thus, the value of the select reference signal may be changed by changing the value of resistor 36. Those skilled in the art will appreciate that the select reference signal on input 35 may be formed by other means than resistors 52 and 36.

In operation, clock 37 generates clock signals at the frequencies of signals 63 and 65. The clock signal that is applied to the set input of latch 41 is selected to be consistent with the frequency of the one of signals 63 or 65 that is selected. The selected clock signal is used to initiate a cycle of both signal 45 and the switching signal on output 33. The clock signals also initiates the corresponding ramps 62 and 64 generating respective signals 63 and 65. Controller 30 receives the FB signal on input 34, and error amplifier 46 forms an error signal that is representative of the deviation of the output voltage from the desired regulated value of the output voltage. Comparator 43 receives the error voltage and compares it to the varying reference signal from selector 59. When the value of the varying reference signal equals the value of the error voltage, the output of comparator 43 goes high to reset latch 41 and terminate the cycle. Resetting latch 41 forces the Q output low and begins disabling transistor 24.

Comparator 53 is configured to form a select signal that controls selector 59 to select either signal 63 or 65. During normal operation, the value of the output voltage generally is close to the desired regulated value as established by the reference signal from reference 51 received by amplifier 46 and by the FB signal. During this normal operation, the value of the FB signal is greater than the select reference signal on input 35 which forces the output of comparator 53 low to select signal 65. The low from comparator 53 disables transistor 56 and enables transistor 57 so that selector 59 couples signal 65 to node 58, thus, to comparator 43. As can be seen from plot 71, signal 65 causes controller 30 and system 10 to operate at the frequency of signal 65 thus at the first frequency. If the value of the current required by load 18 increases, the value of the output voltage may decrease sufficiently to cause the FB signal to decrease to a value that is less than the select reference signal on input 35 thereby forcing the output of comparator 53 high. The high from comparator 53 disables transistor 57, through inverter 60, and enables transistor 56 to couple signal 63 to comparator 43. Consequently, the higher frequency of signal 63 is utilized to terminate this particular cycle of controller 30 that was initiated by the selected clock signal of clock 37. Thus, controller 30 and system 10 now operate at a higher frequency so that system 10 may more quickly respond to the load current transient. As the value of the output voltage increases back closer to the desired regulated output voltage value, the value of the FB signal increases forcing the output of comparator 53 low to once again couple signal 65 to comparator 43, thus, controlling controller 30 to use the first frequency of signal 65 to control the switching signal and regulate the output voltage. The value of resistor 36 generally is selected to ensure that comparator 53 selects signal 65 during normal operation.

Although plots 70 and 71 illustrate that respective signals 63 and 65 have the same amplitude, those skilled in the art will realize that either of signals 63 and 65 may have amplitudes differ from that of the other of signals 63 and 65. Additionally, those skilled in the art will appreciate that the output of amplifier 46 may be used as the signal that is representative of the output voltage, thus, the output of amplifier 46 would be received by comparator 53. For such a case, the inputs to comparator 53 may have to be reversed from that illustrated in FIG. 1.

In order to implement this functionality for controller 30, regulator 38 is coupled to receive power between input 31 and return 32. An output of ramp 62 is connected to a source of transistor 56 which has a drain connected to node 58. An output of ramp 64 is connected to a source of transistor 57 which has a drain connected to node 58. A gate of transistor 57 is connected to an output of inverter 60 which has an input commonly connected to a gate of transistor 56 and the output of comparator 53. Node 58 is connected to a non-inverting input of comparator 43. An inverting input of comparator 43 is commonly connected to an output of amplifier 46 and a first terminal of impedance 48. An output of comparator 43 is connected to the reset input of latch 41. An inverting input of amplifier 46 is commonly connected to a second terminal of impedance 48 and a first terminal of impedance 47. A second terminal of impedance 47 is commonly connected to input 34 and the inverting input of comparator 53. A non-inverting input of amplifier 46 is connected to the output of reference 51. A non-inverting input of comparator 53 is commonly connected to a first terminal of resistor 52 and to input 35. A second terminal of resistor 52 is connected to output 39. The Q output of latch 41 is connected to an input of driver 42 which has an output connected to output 33.

Figure 3:
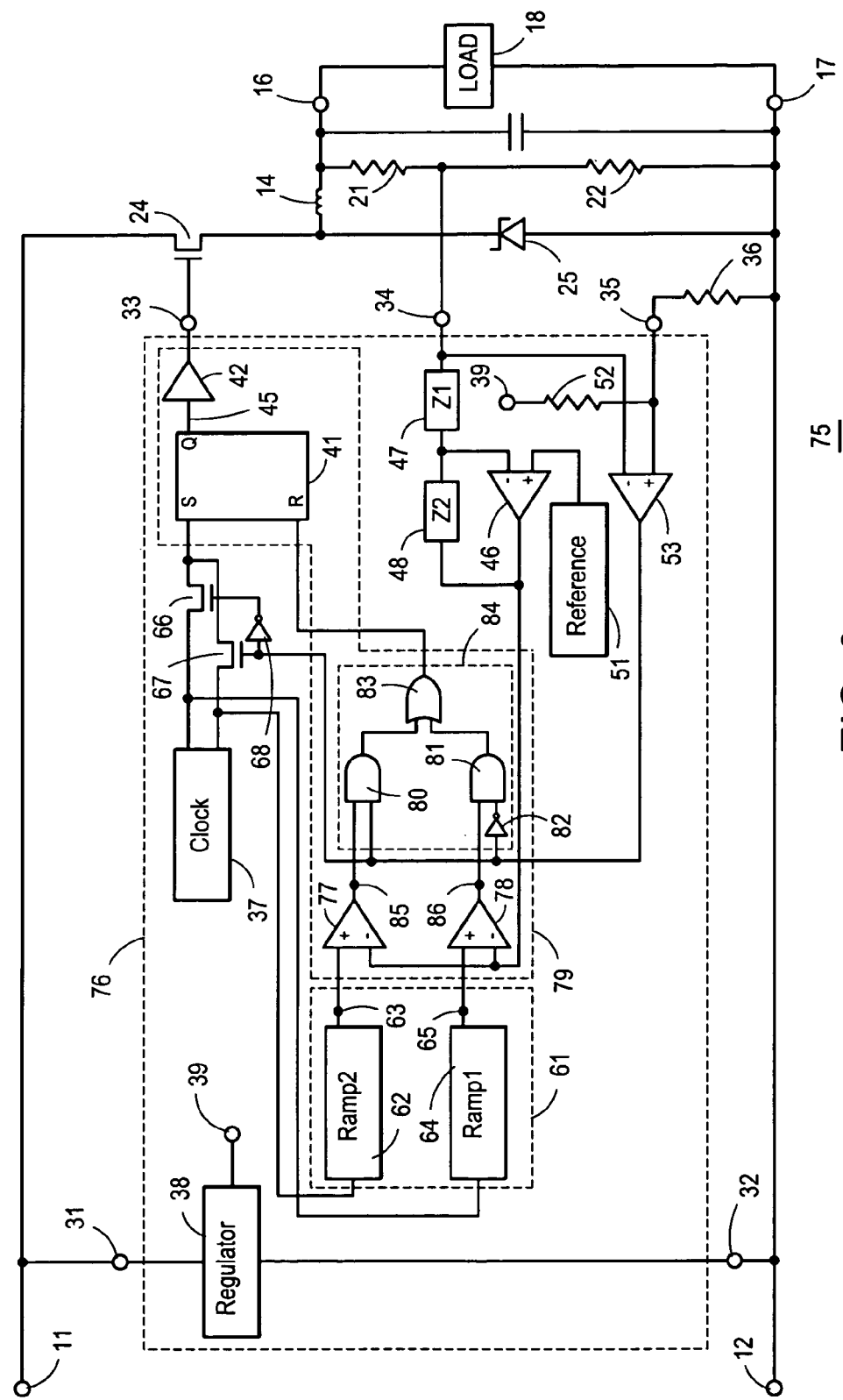
FIG. 3 schematically illustrates an embodiment of a portion of a power supply system having a power supply controller that is an alternate embodiment of the power supply controller of FIG. 1 in accordance with the present invention.

FIG. 3 schematically illustrates an embodiment of a portion of a power supply control system 75 that is an alternate embodiment of system 10 explained in the description of FIG. 1. System 75 includes a power supply controller 76 that is an alternate embodiment of controller 30 explained in the description of FIG. 1. Controller 76 has a PWM control section 79 that is an alternate embodiment of section 40 and selector 59 that are explained in the description of FIG. 1. Section 79 includes PWM comparators 77 and 78, and selector logic or selector 84. Selector 84 includes AND gates 80 and 81, inverter 82, and an OR gate 83. Comparators 77 and 78 function similarly to comparator 43 (FIG. 1). Comparator 78 receives signal 65 and the error signal from amplifier 46 and responsively forms a first PWM comparator signal 86 that has the first frequency of signal 65. Similarly, comparator 77 receives signal 63 and the error signal from amplifier 46 and forms a second PWM comparator signal 85 that has the second frequency of signal 63. Selector 84 is configured to select between signals 85 and 86, and couple one of signals 85 and 86 to latch 41 so that controller 76 may use either signal 86 that varies at the first frequency to form signal 45 responsively to a first value of the output voltage or may use signal 85 that varies that the second frequency to form signal 45 responsively to a second value of output voltage.

In order to implement this functionality of controller 76, the output of ramp 62 is connected to a non-inverting input of comparator 77 and the output of ramp 64 is connected to a non-inverting input of comparator 78. An inverting input of comparators 77 and 78 is connected to the output of amplifier 46. The output of comparator 77 is connected to a first input of gate 80 and the output of comparator 78 is connected to a first input of gate 81. A second input of gate 81 is connected to an output of inverter 82. An input of inverter 82 is commonly connected to a second input of gate 80 and the output of comparator 53. An output of gate 80 is connected to a first input of gate 83 and an output of gate 81 is connected to a second input of gate 83. An output of gate 83 is connected to the reset input of latch 41.

Figure 4:
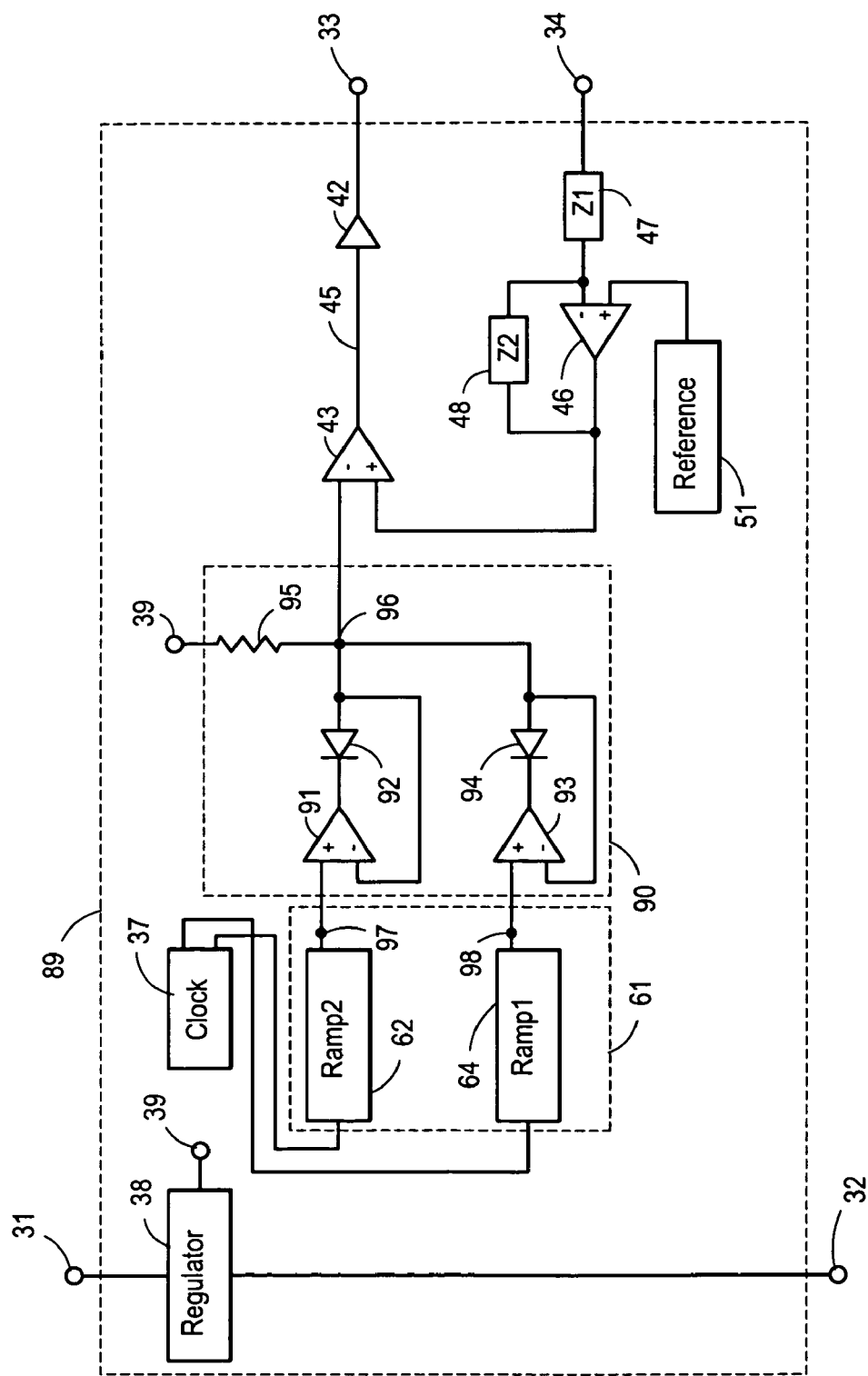
FIG. 4 schematically illustrates an embodiment of a portion of a power supply controller that is an alternate embodiment of the power supply controller of FIG. 1 in accordance with the present invention.

FIG. 4 schematically illustrates an embodiment of a portion of a power supply controller 89 that is an alternate embodiment of controller 30 explained in the description of FIG. 1. Controller 89 includes a selector 90 that is an alternate embodiment of selector 59 that was explained in the description of FIG. 1. Selector 90 includes amplifiers 91 and 93 and ORing diodes 92 and 94. The preferred embodiment of ramps 62 and 64 are modified to form respective signals 97 and 98 that are alternate embodiments of signals 63 and 65, respectively. Signals 97 and 98 have similar frequencies as those of respective signals 63 and 65, but the amplitudes are different.

Amplifier 91 receives signal 97 and amplifies it, preferably with a unity gain, to form an output signal from amplifier 91 at the anode of diode 92. Similarly, amplifier 93 receives signal 98 and amplifies it, preferably with a unity gain, to form an output signal from amplifier 93 at the anode of diode 94. The physical output structures of amplifiers 91 and 93 are isolated from each other by respective diodes 92 and 94 thereby facilitating ORing the signals from amplifiers 91 and 93 together at a node 96. The signal formed at node 96 has both signals 97 and 98, as amplified by amplifiers 91 and 93, effectively ORed together. Since controller 89 is implemented without a PWM latch, the output of comparator 43 forms PWM control signal 45.

Figure 5:
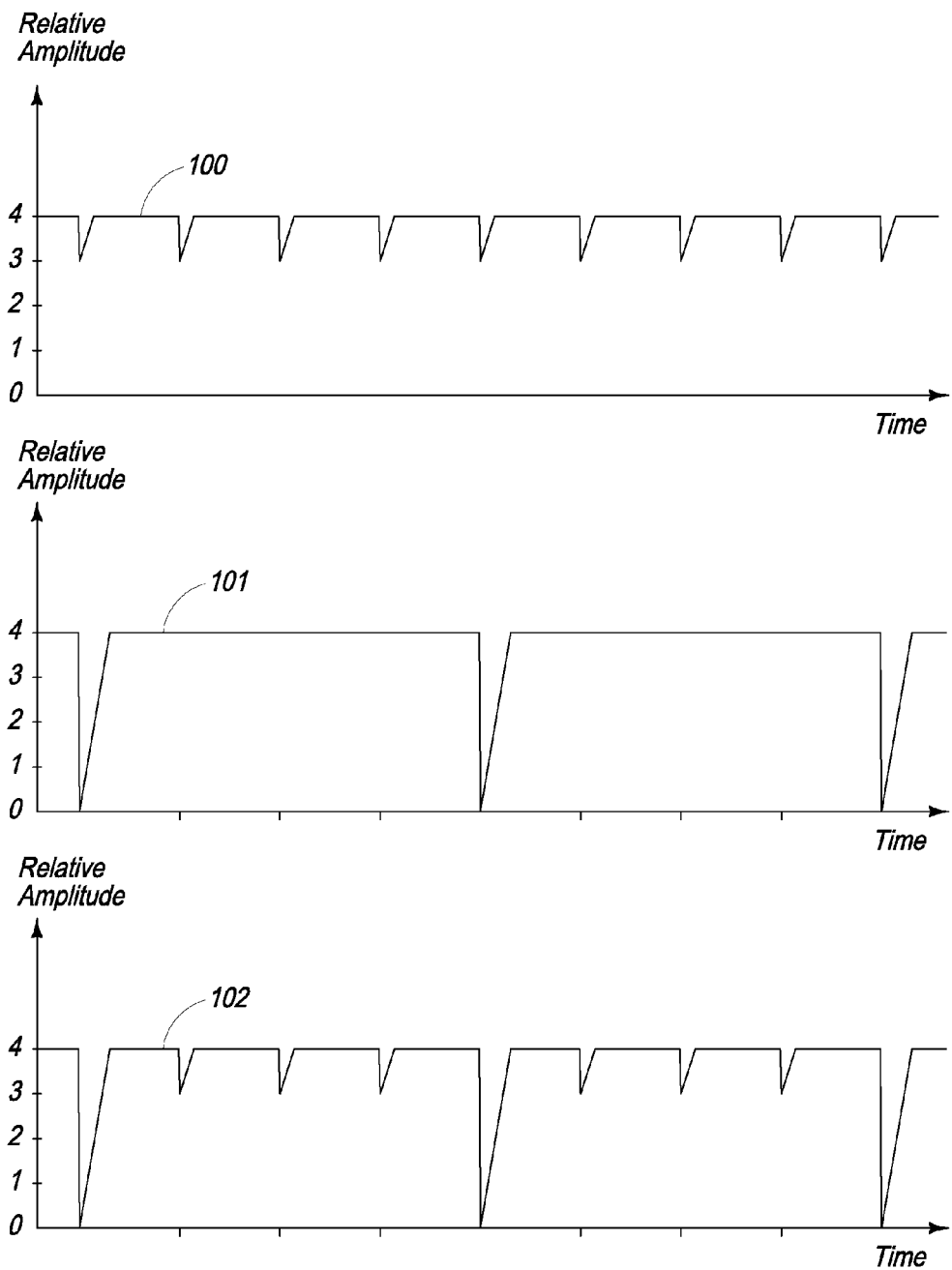
FIG. 5 is a graph having plots of some signals of the power supply controller of FIG. 4 in accordance with the present invention.

FIG. 5 is a graph having plots that illustrate the amplitude and frequency of signals 97 and 98. The abscissa indicates time and the ordinate illustrates relative amplitude of the signals. A plot 100 illustrates the amplitude and frequency of signal 97 and a plot 101 illustrates the frequency and amplitude of signal 98. A plot 102 illustrates the signal at node 96. This description has references to both FIG. 4 and FIG. 5.

As will be seen further hereinafter, the maximum amplitude of signal 97 is selected to be less than the maximum amplitude of signal 98 to facilitate the selection function. As illustrated in FIG. 5, the amplitude of the signal from amplifier 93 has a lower frequency and a more negative peak value than the frequency and peak value of the output of amplifier 91. For values of the output voltage on output 16 (See FIG. 1) that are within the regulated range, the output of error amplifier 46 has a value that is more negative than the peak value of the output of amplifier 91, thus, the value of the error signal from amplifier 46 is not positive enough to intersect the signal from amplifier 91 and diode 92. If a transient occurs, the value of the error signal is increased sufficiently so that the error signal may intersect the signal from amplifier 91 and diode 92. Consequently, the varying amplitude of the error signal and the different amplitude of the reference signals from amplifiers 91 and 93 function to select the first or second reference signals responsively to the value of the output voltage as represented by the FB signal.

In order to implement this functionality of section 90, a non-inverting input of amplifier 91 is connected to the output of ramp 62 and an inverting input is connected to node 96 and to an anode of diode 92. A cathode of diode 92 is connected to an output of amplifier 91. A non-inverting input of amplifier 93 is connected to the output of ramp 64 and an inverting input of amplifier 93 is connected to node 96 and to an anode of diode 94. A cathode of diode 94 is connected to the output of amplifier 93. A first terminal of a resistor 95 is connected to node 96 and a second terminal is connected to output 39.

Figure 6:
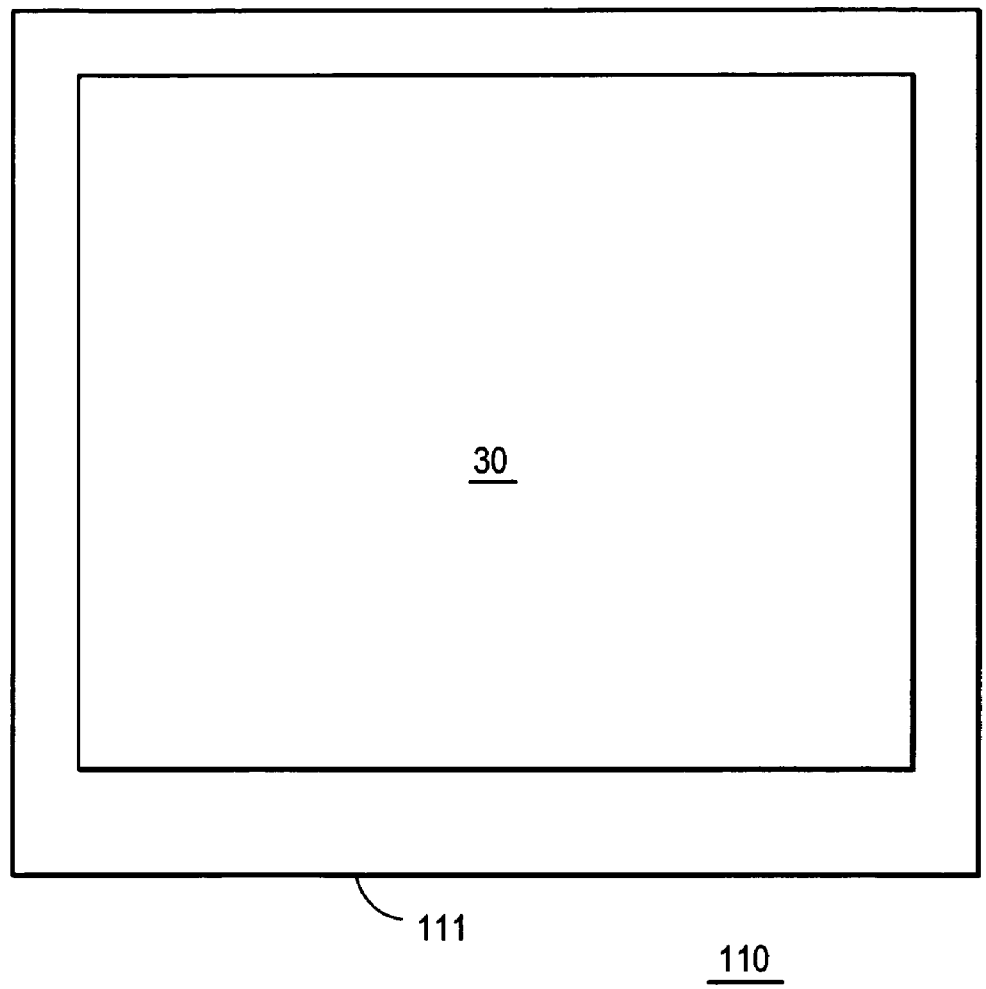
FIG. 6 illustrates an enlarged plan view of a semiconductor device that includes the power system of FIG. 1 in accordance with the present invention.

FIG. 6 schematically illustrates an enlarged plan view of a portion of an embodiment of a semiconductor device 110 that is formed on a semiconductor die 111. Controller 30 is formed on die 111. Die 111 may also include other circuits that are not shown in FIG. 6 for simplicity of the drawing. Controller 30 and device 110 are formed on die 111 by semiconductor manufacturing techniques that are well known to those skilled in the art.

In view of all of the above, it is evident that a novel device and method is disclosed. Included, among other features, is configuring a power supply controller to use a plurality of variable reference signals that each have an output signal that varies in amplitude over a time period and that each repeats the signal at different frequencies from each other. Using a reference signal with a fast frequency during transient events improves the response time to the transient event.

While the invention is described with specific preferred embodiments, it is evident that many alternatives and variations will be apparent to those skilled in the semiconductor arts. For example, forming the reference signals as ramp shaped signals is one preferred embodiment and the reference signals may have other waveshapes. Also, various methods of forming the reference signals and selecting between the different frequencies may be used as long as the frequencies are selected based upon a value of the output voltage. Those skilled in the art will appreciate that although a buck power supply controller is used to explain some embodiments of the subject matter of the invention, other power supply configurations may be used including a boost system configuration. Additionally, the word "connected" is used throughout for clarity of the description, however, it is intended to have the same meaning as the word "coupled". Accordingly, "connected" should be interpreted as including either a direct connection or an indirect connection.

The invention claimed is:
1. A power supply controller comprising:
a PWM section configured to form a switching signal to control a power switch responsively to a first signal that is representative of an output voltage;
a reference generator section configured to form a first reference signal that varies at a first frequency to form the switching signal responsively to a first value of the output voltage and to form a second reference signal that varies at a second frequency to form the switching signal responsively to a second value of the output voltage, the reference generator including a first ramp generator con- figured to form the first reference signal and a second ramp generator configured to form the second reference signal; and a selector to select between the first reference signal and the second reference signal.

2. The power supply controller of claim 1 further including an error amplifier coupled to receive the first signal and a third reference signal.

3. The power supply controller of claim 2 wherein the third reference signal has a fixed value.

4. The power supply controller of claim 1 further including a comparator coupled to receive the first signal and a fourth reference signal and responsively form a select signal coupled to cause the power supply controller to select between the first reference signal and the second reference signal.

5. The power supply controller of claim 4 wherein the fourth reference signal has a fixed value.

6. The power supply controller of claim 1 wherein the first ramp generator is configured to form a first ramp signal having a first maximum amplitude and having a first period determined by the first frequency, wherein the second ramp generator is configured to form a second ramp signal having a second maximum amplitude and having a second period determined by the second frequency, and wherein the first period is different from the second period.

7. The power supply controller of claim 1 further including a first transistor configured to receive the first reference signal and couple the first reference signal to a node responsively to the first value of the output voltage and a second transistor coupled to receive the second reference signal and couple the second reference signal to the node responsively to the second value of the output voltage.

8. The power supply controller of claim 1 further including a first comparator configured to receive the first reference signal and a second comparator coupled to receive the second reference signal, a first gate having a first input coupled to an output of the first comparator, a second input coupled to receive a select signal, and an output, a second gate having a first input coupled to an output of the second comparator, a second input coupled to receive an inverted select signal, and an output, and a third gate having a first input coupled to the output of the first gate, a second input coupled to the output of the second gate, and an output coupled to a PWM latch of the PWM section.

9. A method of forming a power supply controller comprising:

configuring the power supply controller to receive a first signal representative of an output voltage and responsively form a switching signal to control a power switch to regulate a value of the output voltage;

configuring the power supply controller to use at least a first reference signal having a first frequency to form the switching signal responsively to a first value of the output voltage and to use a second reference signal having a second frequency that is different from the first frequency to form the switching signal responsively to a second value of the output voltage wherein both the first and second frequencies are greater than zero; and configuring the power supply controller to select between using the first reference signal to form the switching signal and using the second reference signal to form the switching signal.

10. The method of claim 9 wherein configuring the power supply controller to use at least the first reference signal having the first frequency to form the switching signal responsively to the first value of the output voltage and the second reference signal having the second frequency to form the switching signal responsively to the second value of the output voltage includes configuring the power supply controller to form the first reference signal having a first ramp shaped waveform that varies at the first frequency and to form the second reference signal having a second ramp shaped waveform that varies at the second frequency.

11. The method of claim 10 wherein configuring the power supply controller to form the first reference signal having the first ramp shaped waveform that varies at the first frequency and to form the second reference signal having the second ramp shaped waveform that varies at the second frequency includes configuring a first ramp generator to form the first reference signal and configuring a second ramp generator to form the second reference signal.

12. The method of claim 9 wherein configuring the power supply controller to use at least the first reference signal having the first frequency to form the switching signal responsively to the first value of the output voltage and the second reference signal having the second frequency to form the switching signal responsively to the second value of the output voltage includes configuring the power supply controller to couple the first reference signal to a PWM control section of the power supply controller responsive to the first value of the output voltage and to couple the second reference signal to the PWM control section responsive to the second value of the output voltage.

13. The method of claim 12 wherein configuring the power supply controller to couple the first reference signal to the PWM control section of the power supply controller responsive to the first value of the output voltage and to couple the second reference signal to the PWM control section responsive to the second value of the output voltage includes coupling the power supply controller to compare the first signal to a substantially fixed reference signal to determine the second value.

14. The method of claim 9 wherein configuring the power supply controller to use at least the first reference signal having the first frequency to form the switching signal responsively to the first value of the output voltage and the second reference signal having the second frequency to form the switching signal responsively to the second value of the output voltage includes configuring the power supply controller to determine the second value to be less than the first value.

15. A power supply control method comprising:

selecting between using a first varying reference signal having a first frequency to control an output voltage of a power supply responsively to a first value of the output voltage and using a second varying reference signal having a second frequency to control the output voltage responsively to a second value of the output voltage, including forming the first varying reference signal to have a first maximum amplitude that is different from a second maximum amplitude of the second varying reference signal.

16. The method of claim 15 wherein selecting between using the first varying reference signal includes comparing a signal representative of the output voltage to a reference signal to form a select signal and using the select signal to select between using the first varying reference signal and the second varying reference signal.

17. The method of claim 15 wherein selecting between using the first varying reference signal having the first frequency includes starting a period of the first varying reference signal synchronously with a period of the second varying reference signal.

* * * * *